(12) United States Patent
Holder et al.

(10) Patent No.: US 8,863,617 B2
(45) Date of Patent: Oct. 21, 2014

(54) MOTOR VEHICLE TRANSMISSION

(75) Inventors: Mario Holder, Tettnang (DE); Dietmar Illerhaus, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 249 days.

(21) Appl. No.: 13/383,038

(22) PCT Filed: Jul. 14, 2010

(86) PCT No.: PCT/EP2010/060103
§ 371 (c)(1),
(2), (4) Date: Jan. 9, 2012

(87) PCT Pub. No.: WO2011/018291
PCT Pub. Date: Feb. 17, 2011

(65) Prior Publication Data
US 2012/0132017 A1    May 31, 2012

(30) Foreign Application Priority Data

Aug. 13, 2009 (DE) .......................... 10 2009 028 514

(51) Int. Cl.
| | |
|---|---|
| *F16H 37/06* | (2006.01) |
| *B60K 6/40* | (2007.10) |
| *F16D 25/10* | (2006.01) |
| *B60K 6/48* | (2007.10) |
| *B60K 6/38* | (2007.10) |
| *F16D 21/06* | (2006.01) |

(52) U.S. Cl.
CPC ........... *B60K 6/40* (2013.01); *F16D 2021/0661* (2013.01); *F16D 21/06* (2013.01); *F16D 25/10* (2013.01); *B60K 6/48* (2013.01); *B60K 6/38* (2013.01); *B60Y 2400/428* (2013.01); *Y02T 10/6221* (2013.01)
USPC ........... 74/665 R; 74/665 L; 74/661; 74/15.8; 192/48.619

(58) Field of Classification Search
CPC .............. B60K 6/38; B60K 6/40; B60K 6/48; Y02T 10/6221; F16D 21/06; F16D 25/10; F16D 2021/0661
USPC .......... 74/665 A–665 F, 665 R, 665 L, 15.82, 74/15.86; 192/48.619, 48.8; 903/904, 909, 903/912, 915, 952; 180/65.21–65.29; 475/4, 5, 6, 151, 152
See application file for complete search history.

(56) References Cited

U.S. PATENT DOCUMENTS 2,313,679 A * 3/1943 Tangen ........................ 74/15.86
(Continued)

FOREIGN PATENT DOCUMENTS

| DE | 100 36 504 A1 | 2/2001 |
|---|---|---|
| DE | 101 31 816 A1 | 1/2003 |

(Continued)

OTHER PUBLICATIONS

English Translation of Japanese Office Action, i.e., Notification of Reasons for Refusal of corresponding Japanese Application No. 2012-52417, dispatched on Jan. 7, 2014.

*Primary Examiner* — Troy Chambers
*Assistant Examiner* — Valetin Craciun
(74) *Attorney, Agent, or Firm* — Davis & Bujold, PLLC; Michael J. Bujold

(57) ABSTRACT

A motor vehicle transmission having an input shaft, which can be coupled to a drive aggregate, an output shaft, which can be coupled to an output, and several shift elements. At least two shift elements, designed as clutches, are each coupled via an outer clutch plate carrier with the input shaft in such a way that an outer clutch plate carrier of a first radially outer clutch encloses an outer clutch plate carrier of a second radially inner clutch at least sectionally and radially outside. A drive gear is coupled to the input shaft through which a power take-off can be coupled to withdraw power from the input shaft or through which an auxiliary drive aggregate can supply power to the input shaft. The drive gear is linked through the outer clutch plate carrier of the radially inner clutch to the input shaft.

11 Claims, 1 Drawing Sheet

(56) References Cited

U.S. PATENT DOCUMENTS

| | | | | |
|---|---|---|---|---|
| 3,176,532 A | * | 4/1965 | Luenberger | 74/410 |
| 3,319,491 A | * | 5/1967 | Simpson | 475/280 |
| 4,410,071 A | * | 10/1983 | Osterman | 477/4 |
| 4,944,193 A | | 7/1990 | Harada et al. | |
| 5,151,068 A | * | 9/1992 | Mann et al. | 475/322 |
| 5,522,778 A | | 6/1996 | Iwase et al. | |
| 5,647,816 A | * | 7/1997 | Michioka et al. | 475/285 |
| 6,533,692 B1 | * | 3/2003 | Bowen | 475/5 |
| 6,668,953 B1 | | 12/2003 | Reik et al. | |
| 6,679,799 B2 | * | 1/2004 | Bowen | 475/5 |
| 6,719,656 B2 | * | 4/2004 | Bowen | 475/5 |
| 6,938,512 B2 | * | 9/2005 | Tanikawa | 74/467 |
| 6,945,902 B2 | | 9/2005 | Tanikawa | |
| 7,832,537 B2 | | 11/2010 | Blessing et al. | |
| 7,966,901 B2 | * | 6/2011 | Metzinger et al. | 74/331 |
| 8,322,503 B2 | * | 12/2012 | Combes et al. | 192/48.8 |
| 2003/0148843 A1 | * | 8/2003 | Bowen | 475/5 |
| 2004/0182668 A1 | | 9/2004 | Biermann et al. | |
| 2007/0213163 A1 | * | 9/2007 | Combes et al. | 475/100 |
| 2007/0289833 A1 | * | 12/2007 | Chapelon et al. | 192/48.1 |
| 2009/0000896 A1 | * | 1/2009 | Knowles | 192/48.1 |
| 2011/0192693 A1 | * | 8/2011 | Bradley | 192/48.92 |
| 2011/0233021 A1 | * | 9/2011 | Friedmann et al. | 192/48.8 |
| 2012/0217075 A1 | * | 8/2012 | Nomura et al. | 180/65.21 |

FOREIGN PATENT DOCUMENTS

| | | |
|---|---|---|
| DE | 10 2007 022 774 A1 | 11/2008 |
| EP | 1 800 929 A2 | 2/2007 |
| JP | H07304348 A | 11/1995 |
| JP | 2008 185 090 A | 8/2008 |

* cited by examiner

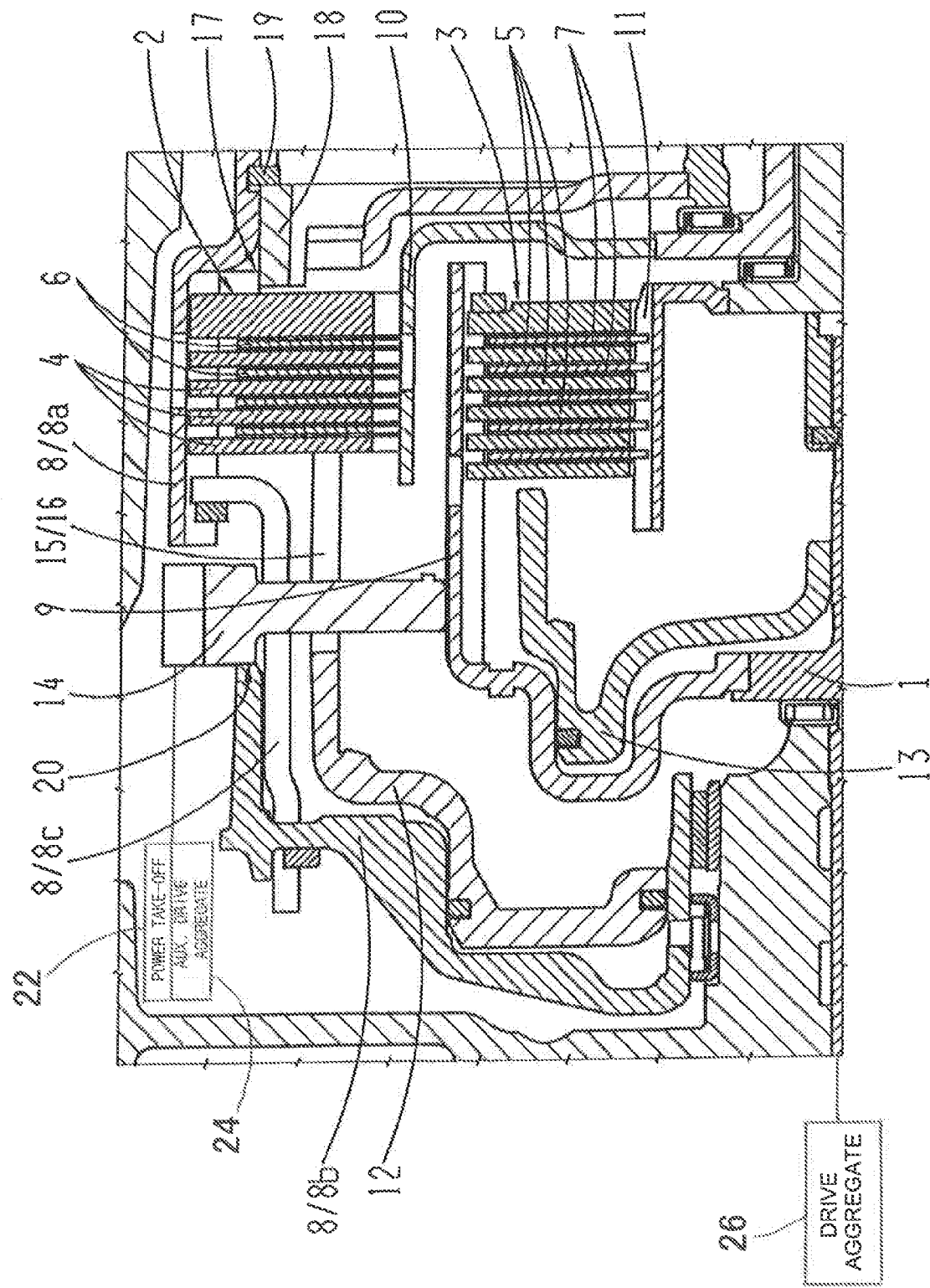

MOTOR VEHICLE TRANSMISSION

This application is a national stage completion of PCT/EP2010/060103 filed Jul. 14, 2010 which claims priority from German Application Serial No. 10 2009 028 514.8 filed Aug. 13, 2009.

FIELD OF THE INVENTION

The invention concerns a motor vehicle transmission.

BACKGROUND OF THE INVENTION

The main components of a drive train of a motor vehicle are a drive aggregate and a transmission, whereby the transmission of the drive train is positioned between the drive aggregate and an output. The transmission converts rotational speeds and torques and provides traction force of the drive aggregate at the output of the drive train. A motor vehicle transmission, namely an automatic or rather an automated shift transmission comprises several shift elements which are positioned between a transmission input shaft and a transmission output shaft of the motor vehicle, wherein the shift elements can be clutches or brakes. For the execution of a gear change or rather shift at least one shift element of the motor vehicle will be opened or rather disengaged and at least one shift element of the motor vehicle closed or rather engaged.

Known from JP 2008-185 090 A is a motor vehicle transmission with several shift elements, designed as clutches or brakes, wherein a power take-off is coupled to the motor vehicle transmission. Such a power take-off is also called PTO (power take out). As the state of the art, in accordance with JP 2008-185 090 A, a drive gear, through which the power take-off is coupled with a transmission input shaft of the motor vehicle, is attached to an outer clutch plate carrier of a radially outer clutch of the motor vehicle transmission. The power flow between the transmission input shaft and the drive gear of the power take-off is thus fed through the outer clutch plate carrier of the radially outer clutch.

To avoid a failure of the outer clutch plate carrier of the radially outer clutch due to the load of the power take-off, and especially complex and robust dimensioning of the outer clutch plate carrier of the radially outer clutch, as well as its bearing base, is required. Especially in the case when it is intended to connect at the outer clutch plate carrier of the radially outer clutch, a power take-off with a large power consumption or even an auxiliary drive aggregate, for instance an electric machine of a hybrid drive, the above concept of a motor vehicle transmission, as known in the state of the art, reaches its limits.

SUMMARY OF THE INVENTION

On this basis, the present invention has the task to create a novel motor vehicle transmission with an improved connection of a power take-off or auxiliary drive aggregate to the transmission input shaft.

This task is solved through a motor vehicle transmission. In accordance with the invention, the drive gear of the power take-off or the auxiliary drive aggregate is linked via the outer clutch plate carrier of a radially inner clutch to the transmission input shaft The present invention first proposes to link the drive gear of the power take-off or of the auxiliary drive aggregate via the outer clutch plate carrier of the radially inner clutch to the transmission input shaft. This has the advantage that a more direct power transfer is possible between the power take-off and the transmission input shaft. Due to its contours, the outer clutch plate carrier of the radially inner clutch tends to fail less than the outer clutch plate carrier of the radially outer clutch. Thus, larger forces and torques can be transferred between the transmission input shaft and the drive gear of the power take-off or rather auxiliary drive aggregate.

BRIEF DESCRIPTION OF THE DRAWINGS

Preferred further embodiments of the invention result from the following description. Embodiments of the invention are further explained through the sole drawing but not limited thereto. It shows a section of the motor vehicle transmission in accordance with the invention.

DETAILED DESCRIPTION OF THE DRAWINGS

The figure shows a section of the motor vehicle transmission, in accordance with the invention, in the area of a transmission input shaft 1 and two clutches 2, 3 designed as shift elements. The first clutch 2 is a radially outer clutch and the second clutch 3 is a radially inner clutch. Besides the clutches 2 and 3 shown in FIG. 1, the motor vehicle transmission comprises additional shift elements which are designed as clutches or brakes.

The two clutches 2 or 3, respectively, each have on their drive side, clutch plates 4 or 5, respectively, and on their output side, clutch plates 6 or 7, respectively. The drive side clutch plates 4 of the radially outer clutch 2 are assigned to an outer clutch plate carrier 8 of the radially outer clutch 2. Also, the drive side clutch plates 5 of the second radially inner clutch 3 are assigned to an outer clutch plate carrier 9 of the radially inner clutch 3. The two outer clutch plate carriers 8, 9 of the two clutches 2, 3 are coupled with the transmission input shaft 1. The outer clutch plate carrier 8 of the radially outer clutch 2 is in this case not directly linked, but is instead indirectly linked with the transmission input shaft 1 via the drive gear 14 and the outer clutch plate carrier 9 of the radially inner clutch 3.

The output side clutch plate 6 or 7, respectively, of the two clutches 2 or 3, respectively, are each assigned to the inner clutch plate carriers 10 or 11, respectively, wherein the output side clutch plate 6 of the first radially outer clutch 2 is assigned to the inner clutch plate carrier 10, and the output side clutch plate 7 of the second radially inner clutch 3 is assigned to the inner clutch plate carrier 11.

Both clutches 2 and 3 are assigned to a respective actuator piston 12 or 13, wherein the actuator piston 12 is assigned to the first, radially outer clutch 2, and the actuator piston 13 to the second, radially inner clutch 3. By way of the actuator pistons 12 and 13, for the engagement of the respective clutches 2 and 3, each of the drive side clutch plates 4 or 5, respectively, can be pressed against the output side clutch plates 6 or 7 of the respective clutches 2 or 3.

The invented motor vehicle transmission in the figure has a drive gear 14, through which either a power take-off 22 can be coupled with the input shaft 1 for power consumption from the transmission or an auxiliary drive aggregate 24 can be linked for as a power supply to the transmission input shaft 1 (the power takeoff 22 and auxiliary drive aggregate 24 are only diagrammatically shown in the figure. The drive gear 14 of the power take-off in the invented motor vehicle transmission or the auxiliary drive aggregate is not linked, as is usual in the state of the art, via the outer clutch plate carrier 8 of the radially outer clutch 2, but instead via the outer clutch plate carrier 9 of the radially inner clutch 3 to the transmission input shaft 1. This allows a direct power transfer between the transmission input shaft 1 and the drive gear 14, and thus between the transmission input shaft 1 and the power take-off 22 or auxiliary drive aggregate 24, respectively. The transmission input shaft 1 can be coupled to a drive aggregate 26 which only diagramatticaly shown in the figure.

The outer clutch plate carrier 9 of the radially inner clutch 3 can transfer larger power and torques than the outer clutch plate carrier 8 of the radially outer clutch 2 so that ultimately larger power and torques can be transferred between the transmission input shaft 1 and the drive gear 14.

That presents especially an advantage when the invented motor vehicle transmission is applied in connection with a hybrid motor vehicle, in which case the electric machine of the hybrid drive is linked, via the drive gear 14, to the transmission input shaft 1.

Due to the fact that the drive gear 14 of the power take-off or auxiliary drive aggregate, respectively, is linked to the outer clutch plate carrier 9 of the radially inner clutch 3, the drive gear 14 of the power take-off or the auxiliary drive aggregate, respectively, penetrates the outer clutch plate carrier 8 of the radially outer clutch 2. Also, the actuator piston 12 of the radially outer clutch 2 penetrates the drive gear 14 of the auxiliary output or auxiliary drive aggregate, respectively.

The actuator piston 12 has therefore a section 15, through which it actuates the drive side clutch plates 4 of the radially outer clutch 2, and has actuator bars 16 which define, extending in the axial direction, through recesses of the actuator piston 12. These actuator bars 16 extend through recesses, which are formed in the drive gears 14 of the power take-off or the auxiliary drive aggregate, respectively. The actuator bars 16 are hereby, with their free ends, placed against a drive side clutch plate 4 of the radially outer clutch 2, to press the drive side clutch plates 4 against the output side clutch plate 6, for the engagement of this clutch 2.

The figure shows that the section 15 of the actuator piston 12 of the radially outer clutch 2, on which the actuator bars 16 are designed, is positioned, viewed in the radial direction, between the outer clutch plate carrier 8 and the inner clutch plate carrier 10 of the radially outer clutch 2. The inner clutch plate carrier 10 of the radially outer clutch 2 is positioned, viewed in the radial direction, between the actuator bars 16 of the actuator piston 12 and the outer clutch plate carrier 9 of the radially inner clutch 3.

An additional feature of the inventive motor vehicle transmission in the figure is the that the outer clutch plate carrier 8 of the radially outer clutch 2, is a multiple part design. In the shown embodiment, the outer clutch plate carrier 8 of the radial outer clutch 2 is a three part construction with three separate segments 8a, 8b, and 8c.

A first segment 8a of the outer clutch plate carrier 8 of the radially outer clutch 2 carries the drive side clutch plates 4 of the clutch 2 and has at least a recess 17, for the installation of assemblies 18, 19, at an end thereof opposite the actuator piston 12 of the clutch 2, for air gap play adjustment. Herein, the assembly 18 is a spacer ring and the assembly 19 is a snap ring. Through respective dimensioning of the snap ring 19, the air gap play between the clutch plates 4 and 6 of the radially outer clutch 2 can be adjusted, meaning during installation on the side of the clutch 2 which is facing away from its actuator piston 12.

A second segment 8b of the outer clutch plate carrier 8 of the radially outer clutch 2 forms stop 20 on one side of the drive gear 14 of the auxiliary output or auxiliary drive aggregate, respectively, the drive gear 14 extends through a third segment 8c of the outer clutch plate carrier 8 of the radially outer clutch 2. The third segment 8c extends between the first segment 8a and the second segment 8b of the outer clutch plate carrier 8 of the radially outer clutch 2.

The main feature of the inventive motor vehicle transmission is therefore the connection of the drive gear 14 of the power take-off or the auxiliary drive aggregate to the transmission input shaft 1 through the outer clutch plate carrier 9 of the radially inner clutch 3.

Additional features are based on the multi-part construction of the outer clutch plate carrier 8 of the radially outer clutch 2, as well as the air gap play adjustment for the radially outer clutch 2, which takes place after its installation at the side of the clutch 2, facing away from the actuator piston 12.

Reference Characters

1 Transmission Input Shaft
2 Radially outer Clutch
3 Radially inner clutch
4 Drive side Clutch Plate
5 Drive side Clutch Plate
6 Output side Clutch Plate
7 Outside side Clutch Plate
8 Outer Clutch Plate Carrier
8a First Segment
8b Second Segment
8c Third Segment
9 Outer Clutch Plate Carrier
10 Inner Clutch Plate Carrier
11 Inner Clutch Plate Carrier
12 Actuator Piston
13 Actuator Piston
14 Drive gear
15 Section
16 Actuator Bar
17 Recess
18 Assembly
19 Assembly
20 Stop

The invention claimed is:

1. A motor vehicle transmission comprising:
a transmission input shaft (1) being connectable to a drive aggregate,
several shift elements,
the shift elements comprising at least first and second clutches (2, 3), each of the first and the second clutches having an outer clutch plate carrier (8, 9) and an inner clutch plate carrier, the outer clutch plate carrier of the second clutch is directly connected with the transmission input shaft and the outer clutch plate carrier (8) of the first clutch (2) radially encloses the outer clutch plate carrier (9) of the second clutch (3) at least sectionally and radially therein, and the first and the second clutches each have a drive output side through which drive is transmitted, respectively, from the first and the second clutches,
a drive gear (14) is connectable to either a power take-off or an auxiliary drive aggregate, and
the drive gear (14) is coupled, via the outer clutch plate carrier (9) of the second clutch (3), to the transmission input shaft (1).

2. A motor vehicle transmission comprising:
a transmission input shaft (1) being connectable to a drive aggregate,
several shift elements,
the shift elements comprising at least first and second clutches (2, 3), each of the first and the second clutches having an outer clutch plate carrier (8, 9) and an inner clutch plate carrier, the outer clutch plate carrier of the second clutch is connected with the transmission input shaft and the outer clutch plate carrier (8) of the first clutch (2) radially encloses the outer clutch plate carrier (9) of the second clutch (3) at least sectionally and radially therein, and the first and the second clutches each have a drive output side through which drive is transmitted, respectively, from the first and the second clutches, the drive gear (14) is connected to either a power take-off or an auxiliary drive aggregate, the drive gear (14) is coupled, via the outer clutch plate carrier (9) of the second clutch (3), to the transmission input shaft (1); and the drive gear (14) extends radially between first and second segments of the outer clutch plate carrier (8) of the first clutch (2), the first segment of the outer clutch plate carrier of the first clutch carries drive input plates of the first clutch and the second segment of the outer clutch plate carrier of the first clutch is located on an axial side of the drive gear opposite the drive input plates of the first clutch.

3. The motor vehicle transmission according to claim 1, wherein an actuator piston (12) biases the drive input plates of the first clutch (2) which are carried by the outer clutch plate carrier (8) of the first clutch (2), such that the drive input plates (4) of the first clutch are pressed against output side clutch plates (6) which are carried by the inner clutch plate carrier (10) of the first clutch (2), and the actuator piston (12) of the first clutch (2) extends through recesses formed in the drive gear (14).

4. The motor vehicle transmission according to claim 3, wherein the actuator piston (12) of the first clutch (2) has actuator bars (16) which define recesses in the actuator piston and which extend in an axial direction of the actuator piston and the actuator bars extend through the recesses in the drive gear (14), and press the drive input plates of the first clutch against the output side clutch plates of the first clutch.

5. The motor vehicle transmission according to claim 3, wherein when viewed in a radial direction, actuator bars (16) of the actuator piston (12) of the first clutch (2) are positioned between the outer clutch plate carrier (8) of the first clutch (2) and the inner clutch plate carrier (10) of the first clutch (2) and, when also viewed in the radial direction, the inner clutch plate carrier (10) of the first clutch (2) is positioned between the actuator bars (16) of the actuator piston (12) of the first clutch (2) and the outer clutch plate carrier (9) of the second clutch (3), the inner clutch plate carrier of the first clutch and the outer clutch plate carrier of the second clutch are radially spaced from each other.

6. The motor vehicle transmission according to claim 1, wherein the outer clutch plate carrier (8) of the first clutch (2) comprises multiple parts.

7. The motor vehicle transmission according to claim 6, wherein a first segment (8a) of the multiple part outer clutch plate carrier (8) of the first clutch (2) carries drive input plates (4) of the first clutch (2) and has at least a recess (17) for installing assemblies (18, 19), from an opposite end of an actuator piston (12) of the first clutch (2), for air gap play adjustment of the first clutch (2).

8. The motor vehicle transmission according to claim 6, wherein a segment (8b) of the multiple part outer clutch plate carrier (8) of the first clutch (2) forms a stop (20) for the drive gear (14) and is located on an axial side of the drive gear opposite from clutch disks of the first clutch.

9. The motor vehicle transmission according to claim 6, wherein the drive gear (14) passes through a segment (8c) of the multiple part outer clutch plate carrier (8) of the first radially outer clutch (2).

10. A motor vehicle transmission comprising:

a transmission input shaft (1) that is connectable to a drive aggregate, a plurality of shift elements, the plurality of shift elements comprising at least a first clutch (2) and a second clutch (3), the first clutch (2) comprises an outer disk carrier (8) that supports drive input disks and inputs drive to the first clutch, and the second clutch comprises an outer disk carrier that supports drive input disks (5) and inputs drive to the second clutch (3), the first clutch (2) and the second clutch (3) are axially aligned such that the outer disk carrier (8) of the first clutch (2) radially surrounds the outer disk carrier (9) of the second clutch (3), and a drive gear (14) is connected to the outer disk carrier (9) of the second clutch (3), and the outer disk carrier of the second clutch is directly connected to the transmission input shaft (1), and the drive gear (14) is connectable to either a power take-off or an auxiliary drive aggregate and transfers drive between the transmission input shaft (1) and the power take-off or the auxiliary drive aggregate, and the first clutch comprises drive output disks that are supported by a drive output disk carrier and which engage the drive input disks of the first clutch and transmit drive through the first clutch, the drive output disk carrier of the first clutch radially surrounds the outer disk carrier of the second clutch and is spaced from the outer disk carrier of the second clutch by a radial gap.

11. The motor vehicle transmission according to claim 10, wherein the outer disk carrier of the first clutch comprises a first segment, which supports the drive input disks of the first clutch, and a second segment, the drive gear extends radially between the first and the second segments such that the drive input disks of the first clutch are located on an axial side of the drive gear that is opposite from the second segment.

* * * * *